(12) United States Patent
Robbins et al.

(10) Patent No.: US 10,110,430 B2
(45) Date of Patent: Oct. 23, 2018

(54) INTELLIGENT AGENT FEATURES FOR WEARABLE PERSONAL COMMUNICATION NODES

(71) Applicant: Orion Labs, San Francisco, CA (US)

(72) Inventors: Jesse Robbins, San Francisco, CA (US); Greg Albrecht, San Francisco, CA (US); Star Simpson, San Francisco, CA (US)

(73) Assignee: Orion Labs, San Francisco, CA (US)

( * ) Notice: Subject to any disclaimer, the term of this patent is extended or adjusted under 35 U.S.C. 154(b) by 118 days.

(21) Appl. No.: 15/166,531

(22) Filed: May 27, 2016

(65) Prior Publication Data

US 2016/0352567 A1    Dec. 1, 2016

Related U.S. Application Data

(60) Provisional application No. 62/166,859, filed on May 27, 2015.

(51) Int. Cl.
 *H04L 12/24* (2006.01)

(52) U.S. Cl.
 CPC ........ *H04L 41/0806* (2013.01); *H04L 41/046* (2013.01)

(58) Field of Classification Search
 None
 See application file for complete search history.

(56) References Cited

U.S. PATENT DOCUMENTS

| | | |
|---|---|---|
| 2006/0178159 A1 | 8/2006 | Timms et al. |
| 2012/0016678 A1 | 1/2012 | Gruber et al. |
| 2014/0081667 A1* | 3/2014 | Joao ...................... G06F 19/322 705/3 |
| 2015/0066817 A1* | 3/2015 | Slayton .................... G06N 5/04 706/11 |
| 2015/0067503 A1* | 3/2015 | Slayton ................... G06F 9/453 715/708 |
| 2015/0186636 A1* | 7/2015 | Tharappel ............... G06F 21/32 726/8 |
| 2015/0215350 A1* | 7/2015 | Slayton ................ H04L 65/403 709/204 |
| 2016/0014222 A1* | 1/2016 | Chen ...................... H04L 67/22 709/204 |
| 2016/0180222 A1* | 6/2016 | Sierhuis .................. G06F 7/023 706/47 |

* cited by examiner

*Primary Examiner* — Natisha D Cox (57) ABSTRACT

Systems, methods, apparatus and software enable intelligent agent features for user nodes that are members of a communication group. Instructions instantiate an intelligent agent node as a member of the communication group. Each intelligent agent node can be instantiated by a communication group management system, an intelligent agent system and/or by one or more of the communication group members, for example by executing software on one or more computing systems or devices. A variety of services and other assistance can be provided by intelligent agent member nodes, including recording communications, auditing communications, providing audio transcription, annotating media, and paging communication devices, including communication nodes that are not members of the communication group. Communications between personal communication nodes and any intelligent agents can be secure.

17 Claims, 5 Drawing Sheets

INTELLIGENT AGENT FEATURES FOR WEARABLE PERSONAL COMMUNICATION NODES

RELATED APPLICATIONS

This application claims the benefit of, and priority to, U.S. Provisional Patent Application No. 62/166,859, entitled "INTELLIGENT AGENT FEATURES FOR WEARABLE PERSONAL COMMUNICATION NODES," filed May 27, 2015, and which is hereby incorporated by reference in its entirety for all purposes.

TECHNICAL FIELD

Aspects of the disclosure are related to communications and, in particular, to intelligent agents usable with communication groups.

TECHNICAL BACKGROUND

Telephones, cellphones, smartphones, computers, and tablets provide an efficient way for users to communicate without being in the same physical location. However, these devices often require the user to provide multiple inputs and preferences for each of the communications before the communications can take place. Such preferences may include identification of the individuals involved in the communication, a contact identifier for the individuals in the communication, amongst a variety of other preferences. Moreover, when busy performing other tasks, it is often difficult to interface with the device (e.g., in changing environments, locations and conditions) while concurrently holding a communicating phone, computer, or tablet, and may distract the user from a current task or situation.

OVERVIEW

Implementations providing intelligent agent features to personal communication nodes (e.g., wearable personal communication nodes) include systems, methods, and software that receive instructions to instantiate one or more intelligent agent nodes as members of a communication group that includes the personal communication nodes. Each intelligent agent node can be instantiated by a communication group management system, an intelligent agent system and/or by one or more of the communication group members, for example by executing software on one or more computing systems or devices. A variety of services and other assistance can be provided by intelligent agent member nodes, including recording communications, auditing communications, providing audio transcription, annotating media, and paging communication devices (including communication nodes that are not members of the communication group). Communications between personal communication nodes and any intelligent agents can be secure (e.g., using encryption).

This Overview is provided to introduce a selection of concepts in a simplified form that are further described below in the Technical Disclosure. It may be understood that this Overview is not intended to identify or emphasize key features or essential features of the claimed subject matter, nor is it intended to be used to limit the scope of the claimed subject matter.

DETAILED DESCRIPTION

Personal communication devices (e.g., cellphones, smartphones, gaming devices, personal computers, tablet computers) can include various voice command features (e.g., keyword-based searching, productivity assistance, or navigation assistance). Further features can include conversational interaction for information transmittal or retrieval, such as activity reminders, weather, stocks, messaging, email, calendar, contacts, notes, music, clocks, web browsers, maps and other applications. Using implementations of intelligent agent features disclosed and claimed herein, personal communication nodes can interact with one or more intelligent agents that are members of and/or otherwise included in communication groups formed of and containing multiple communication nodes. Additionally, such intelligent agents may be virtualized and established in some non-limiting examples as secure members of a communication group for secure (e.g., encrypted) group node communications (e.g., establishing auditing, secure recording, or secure assistance features among group members.

Figure 1:
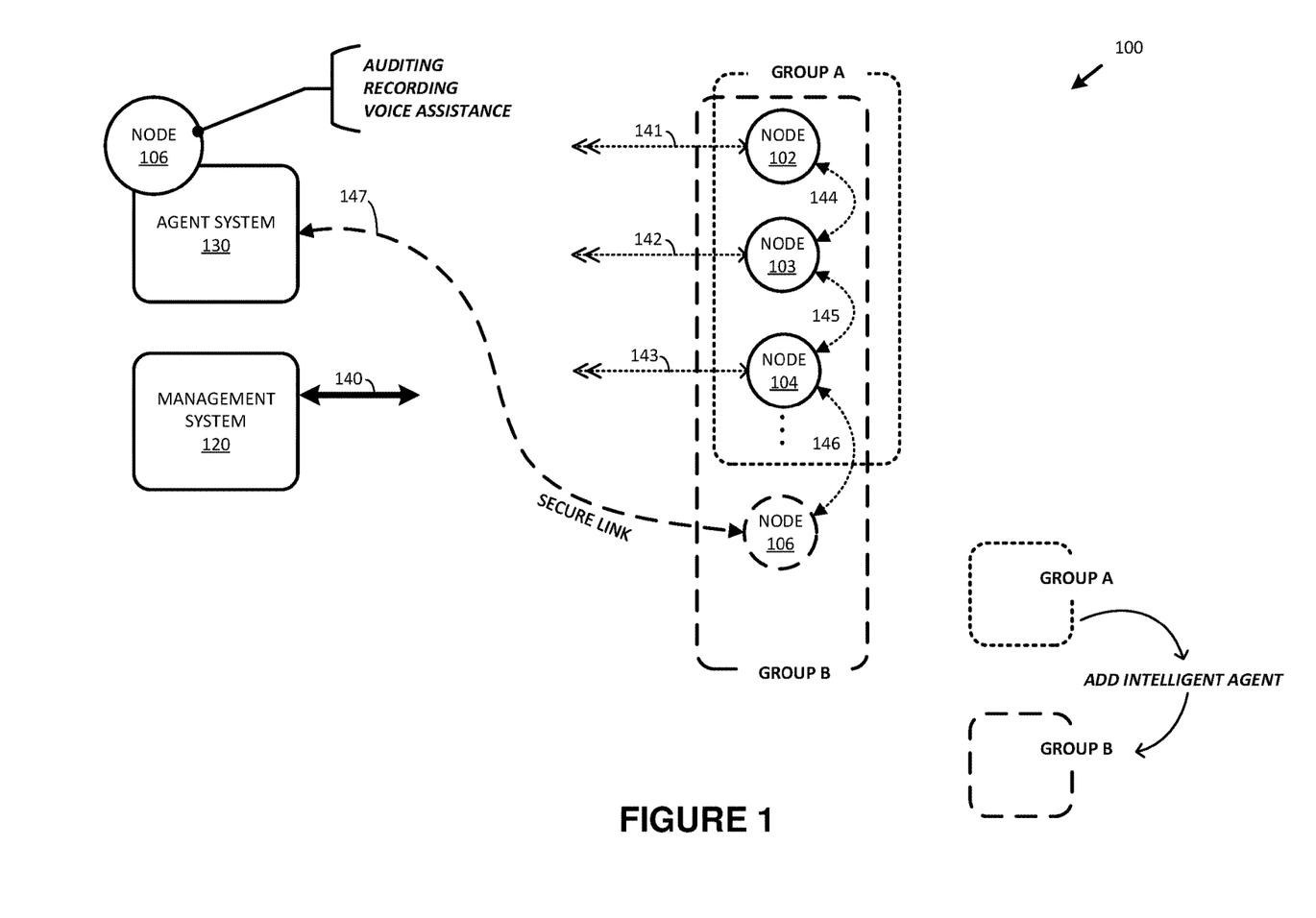
FIG. 1 illustrates a communication system.

FIG. 1 illustrates an exemplary communication system 100 in which intelligent agent features can be established for personal communication nodes 102, 103, 104. System 100 includes nodes 102-104, management system 120, and agent system 130. Personal communication nodes 102-104 can operate in groups (e.g., Group A and Group B of FIG. 1). These groups may be defined by management system 120 based on one or more factors (e.g., dynamic attributes communicated to management system 120 from nodes 102-104 or monitored by system 120). Groups A and B may each comprise a nexus of specified nodes 102-106 (e.g., for interactive communications, information sharing, data exchange, and other mutual exchange).

Personal communication nodes 102-104 may each comprise transceivers, audio transducers, processing systems, communication interfaces, environmental sensors, accelerometers, gyroscopes, Global Positioning System (GPS) receivers, user interfaces, and other systems (including, in some implementations, a computing system to assist in implementing each node). In some implementations each personal communication node comprises a wearable push-to-talk communication device.

Management system 120 may comprise a computing system comprising one or more computing devices capable of managing services to one or more communication groups, each of which may comprise a plurality of personal communication nodes, such as personal communication nodes 102-104, as well as one or more intelligent agent nodes, such as node 106. Intelligent agent features discussed herein may be executed on personal communication nodes 102-104, management system 120, or agent system 130, including combinations and variations thereof.

Personal communication nodes 102-104 communicate with each other over associated links 141-147. These associated links 141-147 also can be used to communicate with other personal communication nodes and/or intelligent agents. Nodes 102-104 also can communicate with management system 120 over associated ones of links 140-143. Management system 120 communicates with personal communication nodes communication via link 140, which can comprise one or more network links in this example. In some implementations links 140-147 can connect personal communication nodes 102-104 to management system 120 and agent system 130 using one or more wireless links that can each comprise Long Term Evolution (LTE), Global System For Mobile Communications (GSM), Code Division Multiple Access (CDMA), IEEE 802.11 WiFi, Bluetooth, Personal Area Networks (PANs), Wide Area Networks, (WANs), Local Area Networks (LANs), or Wireless Local Area Networks (WLANs), including combinations, variations, and improvements thereof. These links can carry communication protocols suitable for wireless communications, such as Internet Protocol (IP) or Ethernet. Additionally, links 140-147 can include one or more wired portions which can comprise synchronous optical networking (SONET), hybrid fiber-coax (HFC), Time Division Multiplex (TDM), asynchronous transfer mode (ATM), circuit-switched, communication signaling, or some other communication signaling, including combinations, variations or improvements thereof. In some examples, communication links 141-145 connect personal communication nodes 102, 103, 104 to each other and/or to other communication nodes. Links 141-145 can comprise Bluetooth, IEEE 802.11 WiFi, infrared, ultrasonic, or any wireless communication format including combinations, variations or improvements thereof. Communication links 140-147 can each use metal, glass, optical, air, space, or some other material as the transport media and may each be a direct link, or may include intermediate networks, systems, or devices, and may include a logical network link transported over multiple physical links.

Each personal communication node 102-104 in FIG. 1 may be configured to obtain (e.g., monitor, collect or receive) attribute information, for example by monitoring one or more attributes from associated positional sensors, audio transducers, GPS receivers, accelerometers, wireless transceivers, environmental sensors, or other devices capable of monitoring the types of attributes discussed herein. Attribute information can comprise any data or other information that may be used dynamically to form, terminate and change groups of nodes, as well as for implementing intelligent agent features for personal communication nodes 102-104. For example, data and/or other information about the sound level of an environment, user preferences, proximity of one personal communication node to another, location, communication status, identity, and/or traveling speed may be used for dynamic formation, termination and changing of node groups, as well as for intelligent agent features for personal communication nodes 102-104.

Personal communication nodes 102-104 can periodically transfer messages for delivery to management system 120 containing or otherwise indicating attribute information (e.g., dynamic changes in one or more attributes). For example, in some non-limiting examples, nodes 102-104 can transfer a message to management system 120 (e.g., periodically and/or when an attribute changes) so that management system 120 can use such attribute changes to form communication node groups and/or to provide intelligent agent features for such nodes. Although management system 120 and agent system 130 are shown as separate entities in FIG. 1, it should be understood that features of management system 120 and agent system 130 can be combined into a single entity or unit, can be included in one or more of personal communication nodes 102-104, or can be implemented in any other suitable fashion.

In addition to forming groups composed solely of personal communication nodes, such as Group A containing nodes 102-104, groups also may be formed in system 100 of FIG. 1 that include an intelligent agent node such as node 106, which assists group members, (e.g., providing automated assistance, actions and/or services). In FIG. 1, intelligent agent node 106 is included as a member of a communication Group B, which also includes at nodes 102, 103, 104, although any number of personal communication nodes can be included. Similarly, Group A comprises nodes 102-104 (e.g., the group may be based on dynamic attributes). A member of Group A (e.g., node 102, node 103 or node 104) may want or need to add an intelligent agent to assist one or more members of Group A, and thus intelligent agent node 106 can be added responsively to form Group B in FIG. 1.

Node 106 can assist and/or perform services for personal communication nodes (e.g., auditing features, audio recording, and voice-command-based assistance features, among others). As shown in FIG. 1, communication links 146 and 147 relate to node 106, though these links can be included in portions of links 140-145. Links 146-147 and others show non-limiting examples of communicative relationships between members of Group B and agent system 130. Furthermore, intelligent agent features of node 106 can be included and executed in one or more of communication nodes 102-104, management system 120, and/or agent system 130, and in distributed implementations using two or more of these components, including combinations and variations thereof.

Intelligent agent features may be customized by agent system 130 to meet specific duties, needs, limitations, etc. of a group. For example, in one non-limiting example Group B may comprise a team of firefighters. Intelligent agent features can be adapted by agent system 130 to use a natural language interface via node 106 to provide information about the fire as well as information regarding the actions and locations of other firefighters and other responders. Intelligent agent features provided by node 106 and/or system 130 of FIG. 1 can include recording conversations among users of nodes 102-104, auditing communications exchanged between nodes 102-104, providing voice-based assistance and services to nodes 102-104, and other features. It should be understood that, just like personal communication nodes, intelligent agent nodes like node 106 can be members of multiple groups. For example, in the example of a fire to which firefighters are responding, a given intelligent agent node might be a member of a first group made up of firefighters, a second group made up of medical response personnel, and a third group made of law enforcement personnel, where the single intelligent agent node provides the same or different features to each group. Similarly, a single group might include multiple intelligent agent nodes, each intelligent agent node being instantiated for a particular purpose or by distinct members of the group which they serve.

Personal communication nodes may communicate securely with each other so that authorized users and their respective nodes can securely share communications, data and other information without unauthorized interception or monitoring of the information or associated communications (e.g., by non-group-member nodes and/or third parties). FIG. 1 shows secure communication link 147 connecting agent system 130 to nodes 102-104; one or more of the other links 140-146 in FIG. 1 can likewise be secured. Secure communication may comprise symmetric key encryption, asymmetric key encryption, public-key encryption, or some other type of encryption, including combinations thereof. Both the content of communications and the transmission links between personal communication nodes can employ secure communication techniques, methods, etc.

Moreover, end to end encryption of communications such as audio communications can be established and utilized among members of the group. Such end-to-end encrypted communications can include transport layer security (TLS), secure sockets layer (SSL) communications, and/or any other suitable secure link types. For example, a secure communication session can be established among an original node group (Group A) including nodes 102-104 in FIG. 1. Node 102 can initiate an intelligent agent, resulting in instantiation of node 106 as a member of a new group (Group B) that likewise includes nodes 102, 103, 104. As the intelligent agent initiating node in this non-limiting example, node 102 can authorize node 106 to engage in a secure communication session of Group B members (e.g., by performing a security handshake and/or involving node 106 to introduce node 106 into the secure communication session between and among nodes 102, 103, 104). In some implementations, group members and/or a management system may have a preselected protocol that automatically instantiates or executes an intelligent agent (e.g., an intelligent agent node) once a secure communication session is established between nodes, which can be useful in environments where a secure recording or other record is to be made of meetings or group communications (e.g., in a corporate setting and/or public agency operation such as law enforcement and first responder activities). In some such implementations, groups including law enforcement or government agency personnel may instantiate a group intelligent agent to monitor and record communications for compliance, auditing and evidentiary purposes.

Node 106 can be executed on a single processing or computing system, such as agent system 130, or can be executed across multiple processing and/or computing systems. In some implementations, node 106 may be executed as a virtual node comprising software or firmware executed by one or more of nodes 102-104 or management system 120 in FIG. 1. In other implementations node 106 can comprise virtualized software executed by a virtual machine that is instantiated upon demand by any of nodes 102-104. This virtual machine can be executed on one or more of the computing or processing elements of FIG. 1, such as nodes 102-104, management system 120, or agent system 130. In some implementations, a user or node 102-104 can specify where and/or how node 106 is to be executed (e.g., by selecting a specific host node or host computing system, or by specifying a physical location, where specified locations can include a home or business server, a country of execution for distributed computing systems, and others). Moreover, when node 106 generates data and/or other information to be recorded, any of node 102-104 or management system 120 can specify where the records and/or other data are to be stored (e.g., in a digital storage device, computer-readable medium associated with a particular computing node, a logical location, and/or a physical location).

Node 106 also can implement assistance features for communication group members. For example, a voice recognition assistance feature allows members to utilize voice commands (e.g., to perform search operations, add or remove nodes from group membership (including node 106), initiate or alter secure communication links or parameters, and annotate incoming communications). Additional features can include voice-based and/or audible interaction for information transmittal or retrieval (e.g., activity reminders, weather reports, stock information, messaging, email, calendar, contacts, notes, music, clocks, web browsers, maps and other applications).

Intelligent annotation features can also be performed by node 106, such as audio transcription of communications that are not initially received in an audio format. For example, email messages, text messages, calendar events, announcements, alerts, computer code, and/or other numeric, textual and data communications can be transcribed into an audio format by node 106. Audio transcription can comprise variable voice features (e.g., different speeds, tones, languages, dialects).

In some intelligent agent implementations, received images, video and/or multimedia content can be conceptually transcribed or annotated. When a user of one of nodes 102-104 receives content, the user can initiate an intelligent assistant, such as node 106, which can transcribe the content descriptively to the user in an audio format. In cases where images, video or other content does not have associated text, node 106 can employ audio descriptors for the content. Images can be evaluated by an intelligent agent using object detection and pattern matching performed to establish textual content associated with objects, patterns, symbols, characters, or other content within the images. This textual content can then be transcribed to an audio format for playback by a node 102-104. Similarly, images in video content can be evaluated based on individual frames processed as images (though additional audio tracks associated with video content may be synchronized to a given audio transcription or annotation). Other content types can be processed to generate descriptive audio for a personal communication node user.

In other non-limiting examples, node 106 can provide group context-aware intelligent agent features. When, as in Group A of FIG. 1, a communication group includes more than one node, intelligent agent node 106 can be instantiated by any of the group's member nodes. Once the intelligent agent is instantiated, in some implementations any of the member nodes can use it to obtain information about other group members. For example, the user of node 102 can verbally query node 106 to obtain information on the current location of node 103. The intelligent agent of node 106 can then respond verbally to group members, supplying information on the current location of node 103 (e.g., a relative location (e.g. "500 meters north of node 102") or geographic coordinates (e.g. GPS coordinates, street address information, or intra-building locations such as conference room identifiers or room numbers). The location information can further include motion, route, or directional information as well. In some implementations node 106 can also respond to requests for current group assignments. For example, the user of node 102 can ask for a list of communication groups in which node 104 is a member, and the intelligent agent can respond accordingly. Other information such as communication status, wireless connectivity status, or other information about a particular node can be requested through the intelligent agent (e.g., information monitored by node device sensors or systems).

A communication node also can request that the intelligent agent issue a page or alert to a node that is not a member of the current communication group. A node responding to the page might join the existing group or might create a new group that includes one or more members of the current communication group. In some of these group context examples, the requesting node is not required to supply group identification information for the node being paged. The intelligent agent can determine which communication group(s) the requested node belongs to and subsequently initiate appropriate action. In examples where audible paging is implemented, for example, the intelligent agent may either join the requested node's group, instantiate itself within that group, or instantiate a new, distinct intelligent agent in the other group. For example, if a paging node instantiates the intelligent agent in a first group and pages a node in a second group, the intelligent agent can automatically identify the paged node's group based on the paged node's identity alone. The intelligent agent can then establish an appropriate presence in the second group and page the appropriate node (e.g., using audible paging).

Figure 2:
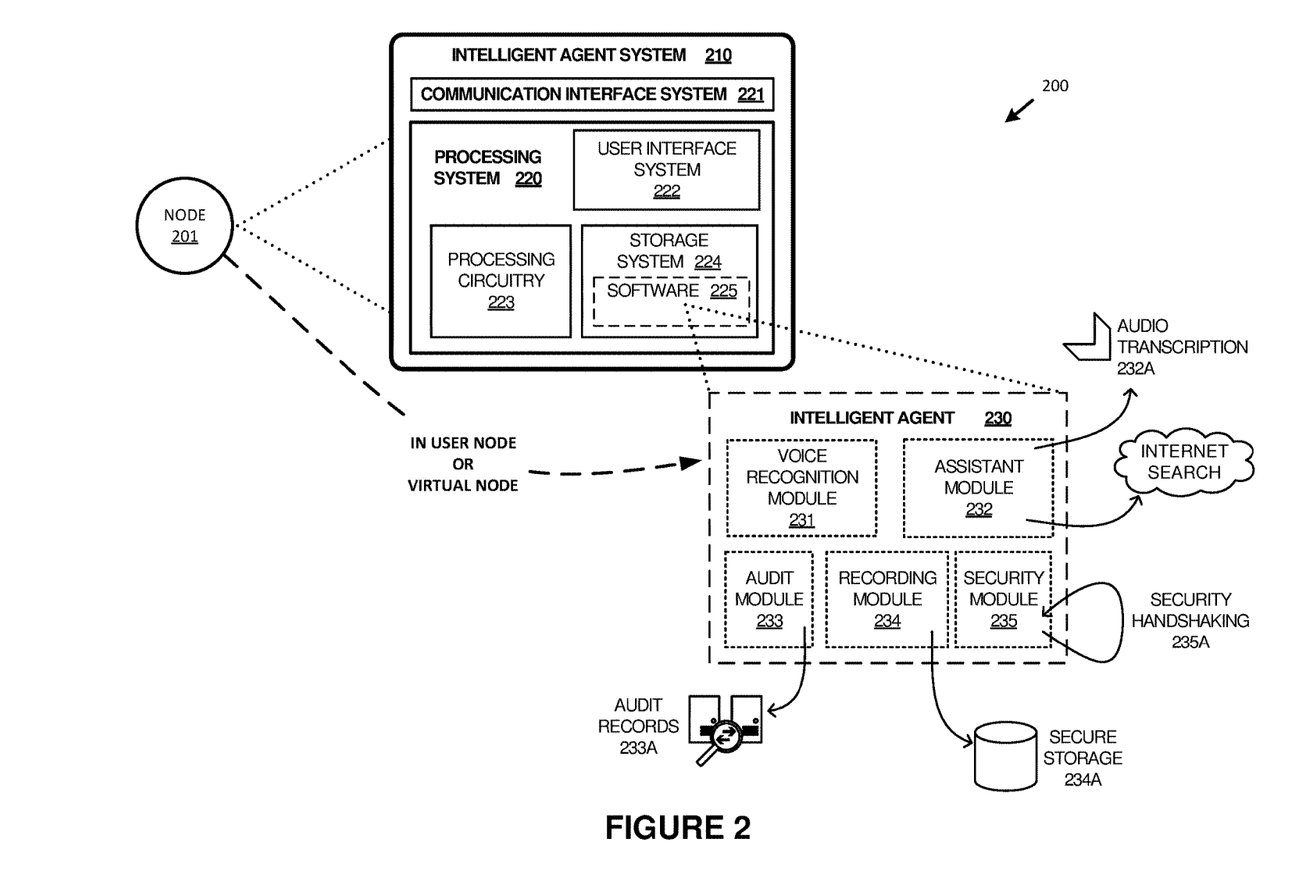
FIG. 2 illustrates an intelligent agent system.

FIG. 2 illustrates exemplary systems 200 implementing intelligent agent features for use by personal communication nodes (e.g., nodes 102-104 of FIG. 1). In FIG. 2, intelligent agent 230 is shown either as being included in software 225 executed by intelligent agent system 210 or as being software executed as a virtual node. Agent 230 can comprise node 106 of FIG. 1.

Intelligent agent system 210 comprises processing system 220 and communication system 221 which are implemented in and/or otherwise provided by one or more computing and communication systems—system 220 and system 221 are shown as separate systems, though they may be combined and/or implemented in one or more computing systems. One exemplary implementation node 201 (which may comprise one of nodes 102-104 of FIG. 1) comprises intelligent agent system 210 that includes, implements, deploys or otherwise generates intelligent agent 230. In another example, intelligent agent 230 is a virtual node and comprises software executed by a personal communication node or by another computing system or device, such as agent system 130 of FIG. 1. Various combinations of one or more personal communication nodes, one or more computing devices, and/or one or more computing systems can execute intelligent agent 230. In some implementations intelligent agent system 210 is a virtual machine that includes the elements of intelligent agent 230 (e.g., where the virtual machine and intelligent agent system 210 are executed in a distributed computing environment, such as a cloud server or cloud system). Although the term intelligent agent is used herein, other terms may be applied instead, such as robot assistant, bot node, virtual assistant bot (vot), Echo node, virtual assistant node, and/or other terms.

Processing system 220 includes user interface system 222, processing circuitry 223 and storage system 224. Storage system 224 stores or otherwise includes software 225 that comprises intelligent agent 230. One or more of the elements of intelligent agent system 210 can be omitted in some examples; similarly, additional elements may be present in given implementations of system 210.

Communication interface system 221 can comprise one or more wireless or wired transceivers for communicating with other devices and systems over one or more wireless or wired links. Example communication links include Bluetooth communication links, WiFi links, infrared links, ultrasonic links, or any other suitable communication link. In some implementations the links comprise virtual or logical links between various software modules (e.g., when intelligent agent 230 is included in the software of a personal communication node). When information is exchanged in some of these implementations (e.g., over the links associated with communication system interface 221), information exchange may occur in accordance with any of a variety of protocols, including FTP (file transfer protocol), HTTP (hypertext transfer protocol), HTTPS (HTTP secure), SOAP (simply object access protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Processing circuitry 223 can comprise microprocessors, microcontrollers, and/or other circuitry that retrieves and executes software 225 from storage system 224. Processing circuitry 223 may comprise a single device or can be distributed across multiple devices, including devices in different geographic areas. Processing circuitry 223 may be embedded in various types of equipment.

Storage system 224 comprises a non-transitory computer readable storage medium, such as a disk drive, flash drive, data storage circuitry, or some other hardware memory apparatus. Storage system 224 may comprise a single device or can be distributed across multiple devices—including devices in different geographic areas. Storage system 224 may be embedded in various types of equipment. In some examples, a computer apparatus can comprise processing system 223, storage system 224 and software 225.

Software 225 comprises intelligent agent 230 in some implementations. Intelligent agent 230, as shown in this non-limiting example, includes voice recognition module 231, assistant module 232, audit module 233, recording module 234, and security module 235. In addition, software 225 (including intelligent agent 230) may include operating systems, utilities, drivers, network interfaces, applications, and other software.

Voice recognition module 231 provides a natural language interface that allows a personal communication node user to issue verbal and/or other audible instructions to and receive feedback from intelligent agent 230. Voice recognition module 231 monitors for voice instructions captured by personal communication node audio transducers. Instructions are translated into digital instructions by voice recognition module 231 and transferred, as necessary, to any of the other modules of intelligent agent 230. Voice recognition module 231 can adapt to individual language usage and preferences. Using voice commands, an end user can dictate instructions in natural language to a personal communication node. These instructions may comprise questions or commands which are handled by intelligent agent 230. Additionally, a specialized voice instruction set can engage various features of intelligent agent 230 (e.g., instantiating intelligent agent 230, establishing a secure communication group that includes intelligent agent 230, auditing communications, and recording communication group audio).

Assistant module 232 receives digital instructions and other information (e.g., from voice recognition module 231, from user interface system 222, and other sources). Such digital instructions can instruct assistant module 232 to perform a given task or service (e.g., a keyword and/or Internet search for content or information, audio transcription of communications 232A, or media received by a personal communication node (e.g., audio transcription of images or video content), calendaring, meeting creation, scheduling, purchasing, recommendations, and mapping).

Audit module 233 performs auditing of audio communications between personal communication nodes, such as auditing communication group members based on the identities of users and/or associated personal communication nodes. Auditing can include logging and/or tracking of various properties of communications between communication nodes and/or an intelligent agent 230 (e.g., tracking and storing information related to physical locations, network locations, group participant/membership, time/day of communications, duration of communications, content of communications, correlation of communication sessions to events (e.g., emergency or planned events)). Each personal communication node can establish individualized auditing and audit records 233A regarding the audited communications and associated audit information can be stored.

Recording module 234 records audio associated with communications of personal communication node groups (e.g., conversations and transmitted media). Recording module 234 can record audio responsive to voice commands received by intelligent agent 230, or responsive to keywords transcribed from audio communications. Furthermore, a textual transcription of the audio communications can be stored along with the audio (e.g., where the transcription is identified based on the content of the audio communications). Each personal communication node may be able to utilize individualized recording. Moreover, secure storage 234A can store recorded communications and associated transcript information (e.g., encrypted versions of communications).

Security module 235 performs one or more security processes (e.g., handshaking 235A), permitting intelligent agent 230 to operate as a secure or encrypted member of a communication group that includes personal communication nodes. An asymmetric or symmetric encryption process or security key exchange can be utilized to secure communications exchanged between and among intelligent agent 230 and communication group members.

Figure 3:
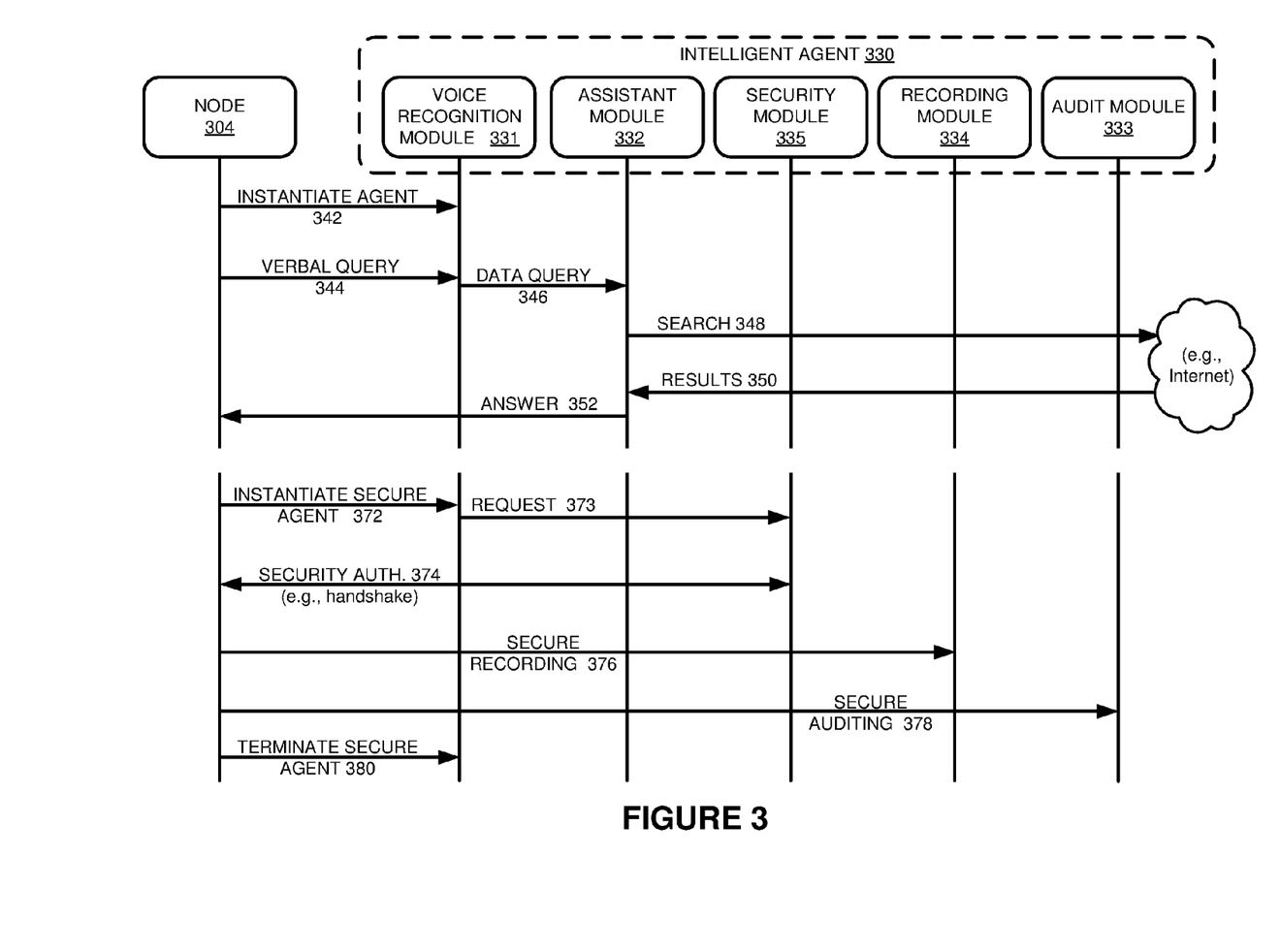
FIG. 3 illustrates a method of operating a communication system.

FIG. 3 illustrates some implementations of the operation of intelligent agent features for personal communication nodes. Intelligent agent 330 of FIG. 3 may be similar to agent 230 of FIG. 2 and may be an example of intelligent node 106 of FIG. 1, however intelligent agent 330 may have alternative configurations and methods of operation. Intelligent agent 330 can comprise software executed by personal communication nodes, agent systems, and/or management systems. An end user can interact with intelligent agent 330 through a personal communication node 304, which may be an example of node 104 of FIG. 1. Other nodes that are members of a communication group that includes node 304 can also interact with intelligent agent 330 in FIG. 3 because intelligent agent 330 is a communication group member that can share audio communications with all group members. Thus, using Group B of FIG. 1 as a non-limiting example, commands or instructions issued through node 102 of Group B can also be received and handled by the intelligent agent instantiated by node 104. In other implementations, only the instantiating personal communication node has access to the associated intelligent agent. Likewise, in other implementations, each node in a communication group may have one or more customized intelligent agents instantiated for an individual node's utilization.

FIG. 3 illustrates the operation of an intelligent agent in connection with group communications in which node 304 is a member. Node 304 may be an example of personal communication nodes 102-104 of FIG. 1; however personal communication node 304 may have alternative configurations and methods of operation. Likewise, intelligent agent 330 of FIG. 3 is an example of an intelligent agent user node 106 of FIG. 1 or an intelligent agent user/virtual node 201 of FIG. 2, an intelligent agent system 210 of FIG. 2, or an intelligent agent software implementation 230 of FIG. 2; however, intelligent agent 330 may have alterative configurations and methods of operation.

In FIG. 3, node 304 instantiates (342) intelligent agent 330, which includes voice recognition module 331, assistant module 332, audit module 333, recording module 334 and security module 335. The user of node 304 queries intelligent agent 330 by transmitting a verbal query (344). Voice recognition module 331 processes the verbal query and converts it into a data query that is transferred (346) to assistant module 332. Assistant module 332 analyzes the data query and performs an Internet search (348) that yields search results that are returned (350) to the assistant module 332 for node 304 (and other members of the communication group to which node 304 belongs). These search results can be presented audibly (and/or in other formats) by intelligent agent 330. Assistant module 332 formulates an answer based on the search results and communicates the answer (352) to node 304 (and/or to other communication group members).

Assistance and services other than Internet searches can be performed by intelligent agent 330 and assistant module 332. In another non-limiting example the user of node 304 might want to make dinner reservations and so poses a verbal request for restaurant recommendations to the user's personal communication node. Voice recognition module 331 processes the query into a data query format, then transfers the data query to assistant module 332, which can perform a search of various networked systems for restaurants, receive the search results, formulate an answer offering several responsive restaurant choices, and the communicate the answer to the end user who chooses one of the restaurant choices provided by assistant module 332. The user may then verbally request a dinner reservation to be made, which voice recognition module 331 receives and processes into a data request. The data request is sent to assistant module 332, which formulates a service confirmation response and sends the service confirmation to the end user, notifying the user that the dinner reservations have been successfully scheduled. The dinner reservation example presented above is non-limiting and merely one of many services that intelligent agent 330 can perform. Other examples include purchasing tickets, retrieving a weather forecast, contacting roadside assistance or emergency response teams, and making a calendar entry.

In another non-limiting example illustrated in FIG. 3, node 304 instantiates intelligent agent 330 as a secure agent (372) for secure participation in the communication group to which node 304 belongs. Voice recognition module 331 can identify this request for a secure communication session with intelligent agent 330, and (after any required data conversion) forward the request (373) for handling by security module 335. Security module 335 responds to the request by performing a security authorization (374), which can be a security handshake or the like (e.g., to grant access and participation in Group B of FIG. 1 as a secure participant). This security authorization can be performed through node 304 (e.g., by having node 304 exchange security keys with intelligent agent 330) to allow intelligent agent 330 to participate in secure (e.g., encrypted) group communications. In other examples, the security authorization is performed with a management system, such as management system 120 of FIG. 1, or with a security node that handles security for personal communication nodes and intelligent agents.

Once intelligent agent 330 is authorized as a secure communication group member, various functions can be performed. In one non-limiting example, secure recording (376) of communication group communications can be performed by recording module 334 (e.g., by recording audio exchanged within the group). The recorded communications can be encrypted (e.g., using a security key specifically used by the communication group). Furthermore, secure auditing (378) of communications can be performed by audit module 333. This auditing can include the functions described herein for audit module 333, such as auditing use of security features and/or security keys used in communications.

Intelligent agent 330 can be terminated (380) after the various functions are completed. In some examples, a vocal keyword or command is transmitted by node 304 or another node to terminate execution of intelligent agent 330. In other non-limiting examples, intelligent agent 330 auto-terminates upon completion of a particular task or activity or after a specified time period. Once terminated, a security credential for intelligent agent 330 can be revoked. Any information generated during the operation of intelligent agent 330 (e.g., secure recordings or auditing data and other records) can be retrieved by one or more of the personal communication nodes, or by other computer systems, at a later time using a new instance of intelligent agent 330 or through other user interface elements.

Figure 4:
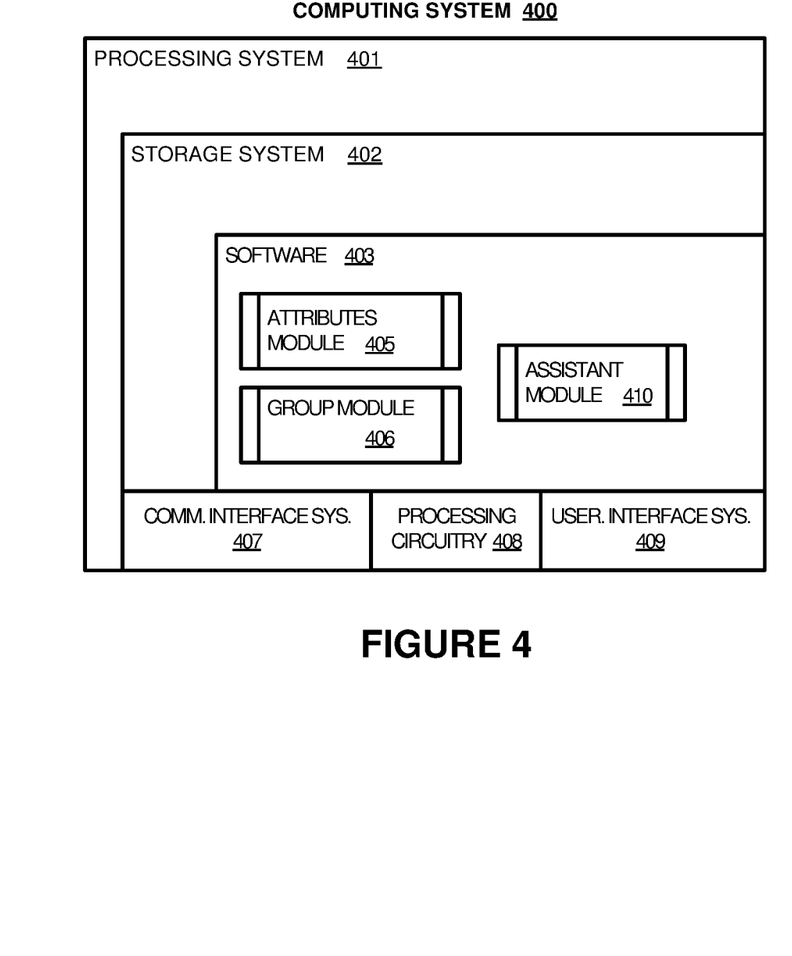
FIG. 4 illustrates a computing system.

FIG. 4 illustrates computing system 400, which can be an example of a computing environment that executes intelligent agent and/or other features of node 106, management system 120 and/or agent system 130 of FIG. 1. Furthermore, elements of computing system 400 can be distributed over one or more computing devices. Computing system 400 includes processing system 401, storage system 402, software 403, communication interface system 407, processing circuitry 408, and user interface system 409.

It may be understood that computing system 400 is generally intended to represent one or more computing systems on which software 403 may be deployed and executed in order to implement intelligent agent module 230 of FIG. 2 or to operate as a personal communication node or a management system. However, computing system 400 may also be suitable as any computing system on which software 403 may be staged and from which one or both may be distributed, transported, downloaded, or otherwise provided to yet another computing system for deployment and execution, or yet additional distribution.

Communication interface system 407 may include communication connections and devices that allow for communication with other computing systems over a communication network. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 409 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures.

User interface system 409 may also include associated user interface software executable by processing system 401 in support of the various user input and output devices discussed above. Separately or in conjunction with each other and other hardware and software elements, the user interface software and user interface devices may support a graphical user interface, a natural user interface, or any other type of user interface. In addition, user input made with respect to the user interfaces may be input via user interface system 409.

Communication between computing system 400 and any other computing system may occur over a communication network or networks and in accordance with various communication protocols, combinations of protocols, or variations thereof. Examples of such communication networks include intranets, internets, the Internet, local area networks, wide area networks, wireless networks, wired networks, virtual networks, software defined networks, data center buses, computing backplanes, or any other type of network, combination of network, or variation thereof. Some communication protocols that may be used include, but are not limited to, the Internet protocol (IP, IPv4, IPv6), the transfer control protocol (TCP), and the user datagram protocol (UDP), as well as any other suitable communication protocol, variation, or combination thereof.

Processing circuitry 408 can comprise one or more microprocessors and other processing circuitry that retrieves and executes software 403 from storage system 402. Processing circuitry 408 can be implemented within a single processing device but can also be distributed across multiple processing devices or sub-systems that cooperate in executing program instructions. Examples of processing circuitry 408 include general purpose central processing units, application specific processors, and logic devices, as well as any other type of processing device, combinations, or variations thereof. In some examples, portions of processing circuitry 408 is physically separate from some elements of computing system 400 and area included in remote servers, cloud-based processing systems, or virtualized computing systems.

Storage system 402 can comprise any non-transitory computer readable storage media capable of storing software 403 that is executable by processing circuitry 408. Storage system 402 can also include various data structures which comprise one or more databases, tables, lists, or other data structures. Storage system 402 can include volatile and nonvolatile, removable and non-removable media implemented in any method or technology for storage of information, such as computer readable instructions, data structures, program modules, or other data. Storage system 402 can be implemented as a single storage device but can also be implemented across multiple storage devices or subsystems co-located or distributed relative to each other. Storage system 402 can comprise additional elements, such as a controller, capable of communicating with processing circuitry 408. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 403 can be implemented in program instructions and among other functions can, when executed by computing system 400 in general or processing circuitry 408 in particular, direct computing system 400, processing system 401, or processing circuitry 408 to operate as described herein for a management node, personal communication node, or an intelligent agent node, among others. Software 403 can include additional processes, programs, or components, such as operating system software, database software, or application software. Software 403 can also comprise firmware or some other form of machine-readable processing instructions executable by elements of processing system 401, such as processing circuitry 408.

In at least one implementation, the program instructions can include attributes module 405, group module 406, and assistant module 410 (other modules can be implemented as well). Attributes module 405 obtains (e.g., monitors, collects or receives) attribute information (e.g., one or more attributes) of personal communication nodes and receives or transfers messages for delivery to a management system or the like (e.g., indicating at least dynamic changes in the one or more attributes). This attribute information (e.g., attributes and dynamic changes in attributes) can be used to form and change dynamic communication groups among personal communication nodes and intelligent agent nodes. Attributes module 405 may periodically or continuously monitor attributes associated with personal communication node sensors or personal communication nodes may send messaging or alerts to attributes module 405 when changes are detected.

Group module 406 monitors group membership status among personal communication (and possibly other) nodes and changes the group membership of personal communication nodes (e.g., based at least on the attributes and group membership status). Assistant module 410 may comprise an intelligent agent, such as intelligent agent 230 of FIG. 2. Assistant module 410 can include voice recognition functions, assistant functions, audit functions, record functions, security functions and others. In addition, software 230 may include operating systems, utilities, drivers, network interfaces, applications, or some other type of software.

In general, software 403 can, when loaded into processing circuitry 408 and executed, transform processing circuitry 408 from a general-purpose computing system into a special-purpose computing system customized to operate as described herein for a management node, personal communication node, or agent node, among other operations. Encoding software 403 on storage system 402 can transform the physical structure of storage system 402. The specific transformation of the physical structure can depend on various factors in different implementations of this description. Examples of such factors can include, but are not limited to the technology used to implement the storage media of storage system 402 and whether the computer-storage media are characterized as primary or secondary storage. For example, if the computer-storage media are implemented as semiconductor-based memory, software 403 can transform the physical state of the semiconductor memory when the program is encoded therein. For example, software 403 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 5:
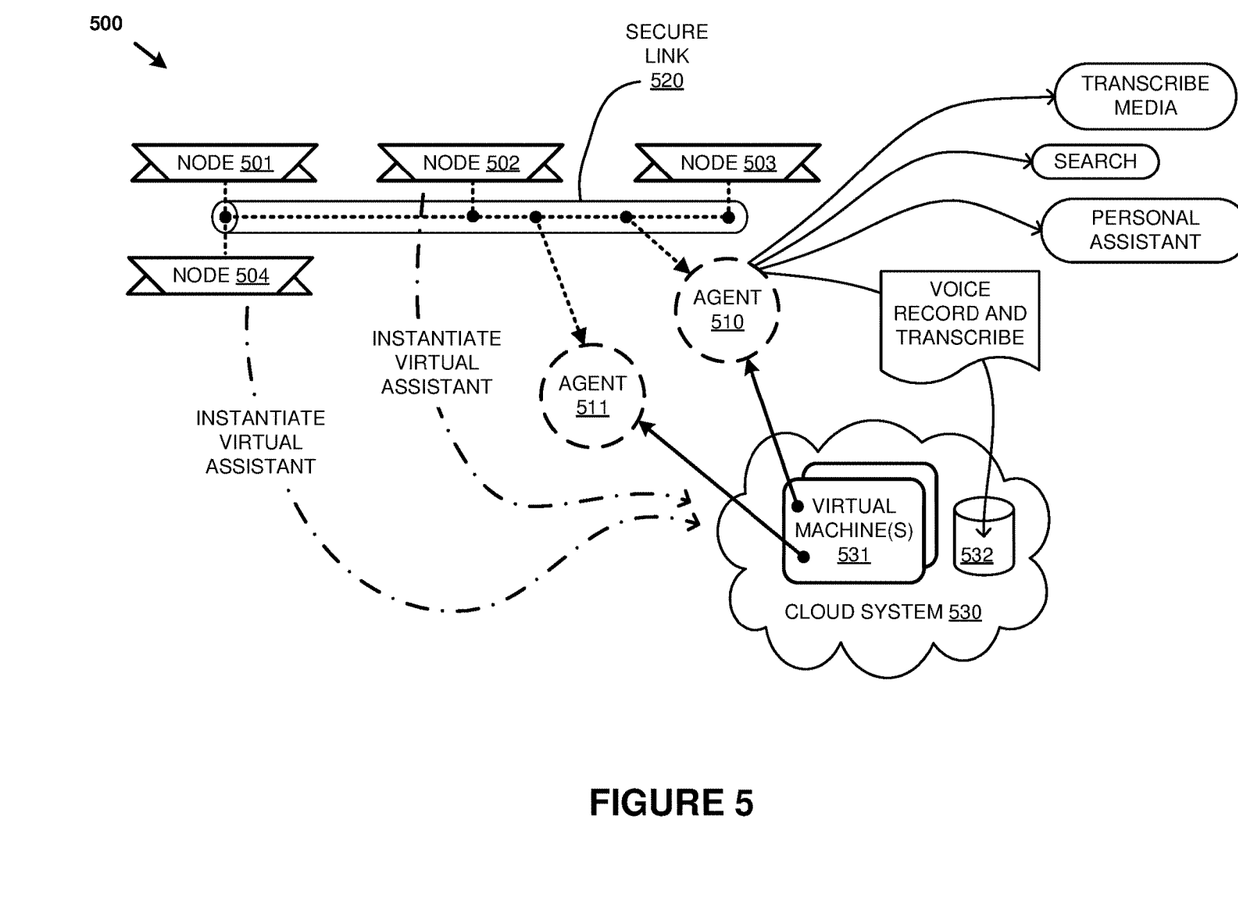
FIG. 5 illustrates a communication system.

FIG. 5 illustrates communication system 500 as a further example of personal communication nodes employing one or more intelligent assistant agents. System 500 includes personal communication nodes 501-504, agents 510-511, and cloud system 530. Personal communication nodes 501-504 may be examples of nodes 102-104 of FIG. 1 and/or node 201 of FIG. 2, though variations are possible. Agents 510-511 may be examples of node 106 of FIG. 1 or intelligent agent 230 of FIG. 2, though variations are possible. FIG. 5 omits any management system(s) for clarity.

In operation, nodes 501-504 form a communication group, examples of which are discussed herein, that may be created, changed, and/or terminated based on attribute information. Nodes 501-504 establish a secure communication link 520 between each other (e.g., a secure tunnel or encrypted link). During audible or other communications of nodes 501-504, intelligent agent features may be requested or desired, such as recording audio or performing search functions.

Node 502 instantiates agent 511 which comprises a virtual machine 531 (which can include elements discussed above for system 210 of FIG. 2) executed in cloud system 530. In this example, agent 511 performs a security handshaking process, is included in the secure link 520 and can thus communicate with any of nodes 501-504. Node 504 instantiates agent 510 which also comprises a virtual machine 531 executed in cloud system 530. Agent 510 performs security handshaking and is included in secure link 520. In this example, agent 510 can securely record voice communications and transcriptions of the voice communications into data storage element 532. Furthermore, either agent 510-511 can perform other intelligent agent functions, such as transcribing media received by any of nodes 501-504, searching responsive to queries for information, or other personal assistant functions described herein. Likewise, either agent 510-511 can also perform communication group context-aware functions, such as paging of nodes in other communication groups, locating of nodes in a communication group, or other functions based on communication group context.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A method of managing a communication group, wherein the communication group comprises a plurality of personal communication member nodes, the method comprising:
   receiving instructions from at least one of the plurality of personal communication member nodes to instantiate an intelligent agent;
   instantiating the intelligent agent as a virtual assistant communication member node in the communication group; and
   the instantiated intelligent agent recording and auditing communications among and between the plurality of personal communication member nodes in the communication group.

2. The method of claim 1 wherein receiving instructions to instantiate the intelligent agent comprises receiving voice instructions through a first personal communication member node in the communication group.

3. The method of claim 1 wherein the intelligent agent is instantiated through a security handshake procedure to provide secure access to the intelligent agent by the plurality of personal communication node members as a secure communication member node in the communication group.

4. The method of claim 1 wherein the intelligent agent is instantiated as a virtual assistant communication member node in the communication group by a virtual machine in a cloud system.

5. The method of claim 1 wherein the intelligent agent is instantiated as a virtual assistant communication member node in the communication group by a management system configured to define the communication group based on attribute information transferred to the management system from the plurality of personal communication member nodes in the communication group.

6. The method of claim 1 wherein each personal communication member node in the plurality of personal communication member nodes comprises a wearable push-to-talk communication device.

7. A non-transitory computer readable storage medium having a distributed group communications application stored thereon, the distributed group communication application including instructions, which when executed by one or more processors of a group communication system, cause the group communication system to:
   receive instructions from at least one of a plurality of personal communication member nodes operating as a communication group to instantiate an intelligent agent; and
   instantiate the intelligent agent as a virtual assistant communication member node in the communication group,
   wherein the instantiated intelligent agent is configured to record and audit communications among and between the plurality of personal communication member nodes in the communication group.

8. The non-transitory computer readable storage medium of claim 7 wherein the instructions to instantiate an intelligent agent comprise voice instructions received by a first personal communication member node in the communication group.

9. The non-transitory computer readable storage medium of claim 7 wherein the intelligent agent is instantiated through a security handshake procedure to provide secure access to the intelligent agent by the plurality of personal communication member nodes as a secure communication member node in the communication group.

10. The non-transitory computer readable storage medium of claim 7 wherein the intelligent agent is instantiated as a virtual assistant communication member node in the communication group by a virtual machine in a cloud system.

11. The non-transitory computer readable storage medium of claim 7 wherein the intelligent agent is instantiated as a virtual assistant communication node in the communication group by a management system configured to define the communication group based on attribute information transferred to the management system from the plurality of personal communication member nodes in the communication group.

12. The non-transitory computer readable storage medium of claim 7 wherein each personal communication member node in the plurality of personal communication member nodes comprises a wearable push-to-talk communication device.

13. A method of operating a group communication system, comprising:
   managing a communication group comprising a plurality of personal communication member nodes, wherein each personal communication member node comprises a user node transmitting and receiving communications between the group members;
   receiving instructions from at least one of the plurality of personal communication member nodes to instantiate an intelligent agent;
   instantiating the intelligent agent as an virtual assistant communication member node of the communication group, wherein the virtual assistant communication member node performs recording and auditing services for the communication group member nodes.

14. The method of claim 13 wherein the communication group is defined by a management system based on attribute information transferred to the management system by the member nodes and is updated based on changes to the attribute information.

15. The method of claim 14 wherein the instructions to instantiate the intelligent agent are voice instructions received by a first communication member node that is a member of the communication group.

16. The method of claim 15 wherein each personal communication member node comprises a wearable push-to-talk communication device.

17. The method of claim 13 wherein communications between the communication group member nodes are encrypted and further wherein the virtual assistant communication member node is securely linked to the communication group.

* * * * *